United States Patent
Cao et al.

(10) Patent No.: US 10,282,277 B2
(45) Date of Patent: May 7, 2019

(54) STREAMS: INTELLIGENT OPERATOR SUBSET FOR DEBUG

(71) Applicant: International Business Machines Corporation, Armonk, NY (US)

(72) Inventors: Bin Cao, Stanford, CA (US); Jessica R. Eidem, Rochester, MN (US); Brian R. Muras, Otsego, MN (US); Jingdong Sun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 14/955,989

(22) Filed: Dec. 1, 2015

(65) Prior Publication Data

US 2017/0153966 A1    Jun. 1, 2017

(51) Int. Cl.
  *G06F 9/44* (2018.01)
  *G06F 11/36* (2006.01)

(52) U.S. Cl.
  CPC ...... *G06F 11/3664* (2013.01); *G06F 11/3688* (2013.01)

(58) Field of Classification Search
  CPC .............. G06F 7/78; G06F 8/00–8/78; G06F 9/44–9/455; G06F 11/36; G06F 11/3688
  USPC ......................................................... 717/124
  See application file for complete search history.

(56) References Cited

U.S. PATENT DOCUMENTS

| | | | | |
|---|---|---|---|---|
| 2006/0070040 A1* | 3/2006 | Chilimbi | ............... | G06F 8/4442 717/130 |
| 2011/0099541 A1* | 4/2011 | Blomstedt | ............... | G06F 8/433 717/136 |
| 2011/0113285 A1 | 5/2011 | Dolby et al. | | |
| 2011/0295578 A1* | 12/2011 | Aldrich | ..................... | G06F 8/10 703/6 |
| 2012/0137178 A1* | 5/2012 | Barsness | ............... | G06F 11/362 714/35 |
| 2012/0215934 A1* | 8/2012 | Barsness | ............... | G06F 9/5083 709/231 |
| 2012/0284698 A1* | 11/2012 | Brunkhorst | ........... | G06F 11/362 717/128 |
| 2013/0014088 A1* | 1/2013 | Park | ..................... | G06F 11/3636 717/128 |
| 2013/0166962 A1* | 6/2013 | Branson | ............... | G06F 11/3065 714/47.3 |
| 2013/0305225 A1 | 11/2013 | Branson et al. | | |

(Continued)

OTHER PUBLICATIONS

Pauw et al., Visual debugging for stream processing applications, 2010 (Year: 2010).*

(Continued)

*Primary Examiner* — Lechi Truong
(74) *Attorney, Agent, or Firm* — Patterson + Sheridan, LLP

(57) ABSTRACT

Techniques are disclosed for identifying a minimal operator subsets in a distributed streams application for debugging purposes. A debugging tool receives a selection of operators from a plurality of operators included in a distributed application. The distributed application executes the plurality of operators in a runtime environment. The debugging tool identifies, based on the selected operators, a subset of the plurality of operators to execute in a debugging environment. The subset includes at least the selected operators. The debugging tool executes the subset of the plurality of operators in the debugging environment.

20 Claims, 7 Drawing Sheets

(56) References Cited

U.S. PATENT DOCUMENTS

| | | | |
|---|---|---|---|
| 2013/0305227 A1 | 11/2013 | Branson et al. | |
| 2013/0326472 A1* | 12/2013 | Han | G06F 8/10 |
| | | | 717/105 |
| 2014/0082424 A1* | 3/2014 | Sanders | G06F 11/3664 |
| | | | 714/38.1 |
| 2015/0007143 A1 | 1/2015 | Barsness et al. | |
| 2015/0124815 A1* | 5/2015 | Beliveau | H04L 45/38 |
| | | | 370/392 |
| 2016/0124836 A1* | 5/2016 | Isman | G06F 11/3636 |
| | | | 717/131 |

OTHER PUBLICATIONS

Zhang et al., Efficient forward computation dynamic slices, 2004 (Year: 2004).*

Yaniv Eytani, Compiling a Benchmark of Documented Multithreaded Bugs. (Year: 2004).*

Jain, A. et al.; "Method and System for Ad-Hoc Debugging of Extraction and Integration Pipelines"; An IP.com Prior Art Database Technical Disclosure; http://ip.com/IPCOM/000197952, Jul. 23, 2010, pp. 1-4.

Carriero Jr., Nicholas John; "Implementation of Tuple Space Machines"; An IP.com Prior Art Database Technical Disclosure; htttp://ip.com/IPCOM/000161331, Dec. 9, 2007, pp. 1-93.

Pfeifer, M. et al.; "Visual Debugging for Stream Processing Applications"; Runtime Verification. Proceedings First International Conference, RV 2010, pp. 18-35.

Gedik, B. et al.; "Tools and strategies for debugging distributed stream processing applications"; Software, Practice and Experience, vol. 39, No. 16, pp. 1347-1376; Nov. 2009.

\* cited by examiner

STREAMS: INTELLIGENT OPERATOR SUBSET FOR DEBUG

BACKGROUND

The present invention relates to debugging, and more specifically, to identifying minimal operator subsets in a distributed streams application for debugging purposes.

In a streams processing environment, multiple nodes in a computing cluster execute a distributed application. The distributed application retrieves a stream of input data from a variety of data sources and analyzes the stream. A stream is composed of data units called "tuples," which is a list of values. Further, the distributed application includes processing elements that are distributed across the cluster nodes. Each processing element includes one or more operators configured to perform a specified task associated with a tuple. Each processing element receives one or more tuples as input and processes the tuples through the operators. Once performed, the processing element may output one or more resulting tuples to another processing element, which in turn performs a specified task on those tuples, and so on.

A developer may design an operator graph using an integrated development environment (IDE) tool. The operator graph specifies a desired configuration of processing elements in the streams processing environment. Using the operator graph, the developer may define functions for each processing element to perform. The functions can specify a given task to perform and a destination processing element for tuple output. Further, the IDE tool may provide a debugger that allows the developer to ensure that the distributed application executes in the streams processing environment as specified.

SUMMARY

One embodiment presented herein describes a method. The method generally includes receiving a selection of operators from a plurality of operators included in a distributed application. The distributed application executes the plurality of operators in a runtime environment. The method also includes identifying, based on the selected operators, a subset of the plurality of operators to execute in a debugging environment. The subset includes at least the selected operators. The subset of the plurality of operators is executed in the debugging environment.

Other embodiments include, without limitation, a non-transitory computer-readable storage medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
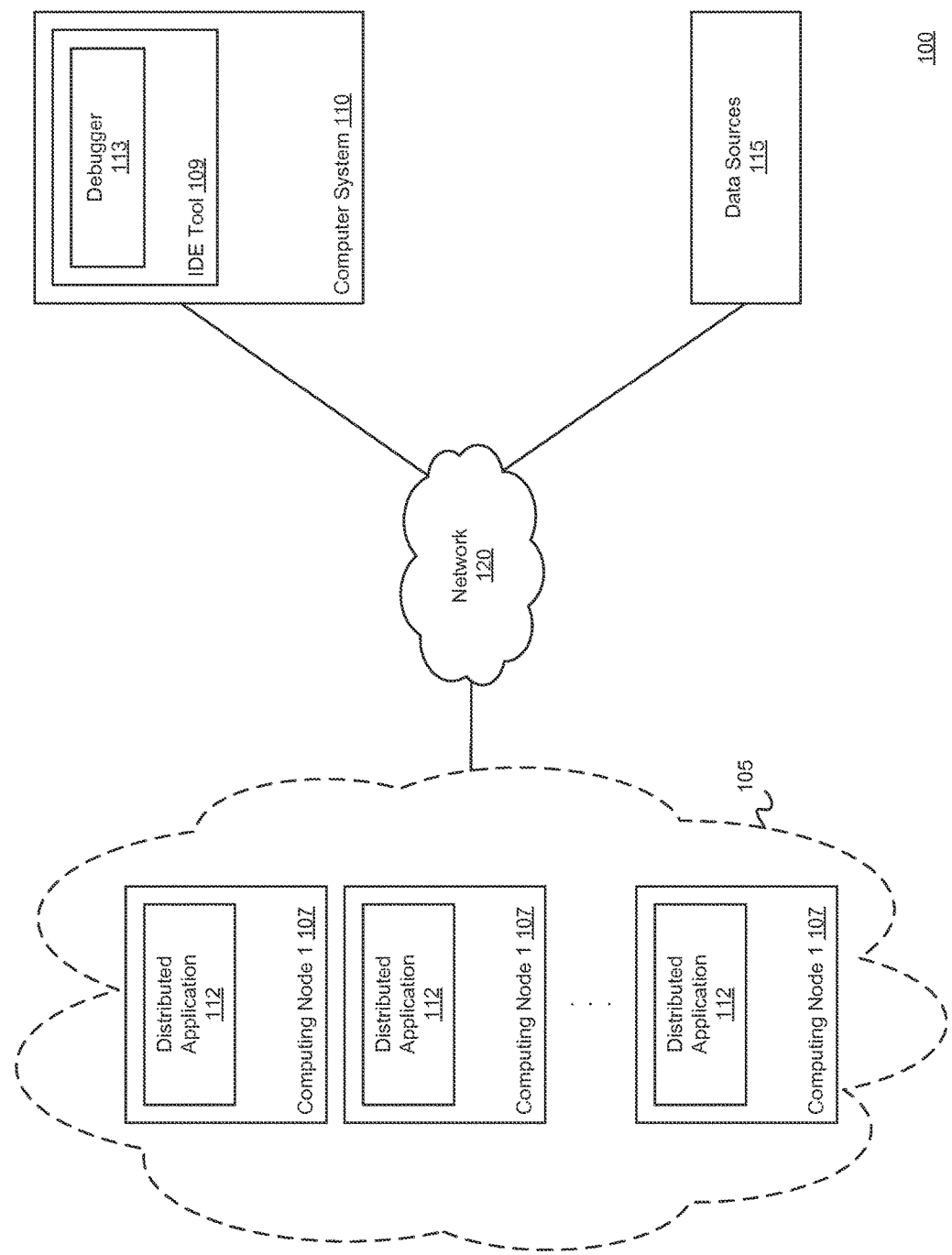
FIG. 1 illustrates an example computing environment, according to one embodiment.

Embodiments presented herein disclose techniques for debugging a subset of operators in a streams processing environment. In one embodiment, a distributed application executes in a computing cluster that provides a streams processing environment. Processing elements of the distributed application retrieve streams of input in data units called "tuples," or a list of input values. Each processing element includes one or more operators that process each tuple and output resulting tuples to other processing elements.

Further, a developer may compose, through an integrated development environment (IDE) tool, an operator graph that specifies a desired configuration of processing elements and operators in the streams processing environment. In one embodiment, the IDE tool includes a debugger that allows the developer to identify and address issues arising in the streams processing environment executing the distributed application. Typically, the debugger loads the entire operator graph into the memory of a computer system executing the debugger. Doing so may be resource-intensive, as a stream processing environment may execute thousands or even tens of thousands of operators and process millions of tuples. Because a developer may want to focus on specific operators at any given time, the current approach of loading an entire set of operators at once is inefficient.

In one embodiment, the debugger receives a selection of operators that a developer wants to debug. In turn, the debugger identifies a minimal subset of operators from that selection to execute for debugging purposes. Because each of the selected operators may rely on input from upstream operators of a given path, the debugger includes such operators in the subset. For example, a selected operator may require a tuple input from an operator immediately preceding that operator. And that preceding operator may require a tuple input from another operator, as well. The debugger may include such operators in the subset for debugging. In addition, if specified, the debugger may also include n amount of downstream operators in the subset.

In one embodiment, to further reduce the amount of operators in the subset, the debugger may generate virtual source and sink operators. The debugger may connect a virtual source operator to supply tuple input to a selected operator. By doing so, the debugger does not need to include upstream operators in the graph that the selected operator may rely upon for input tuples. Similarly, the debugger may connect a virtual sink operator to a selected operator to receive tuple inputs. Virtual sources and sinks allow the selected operators to execute without having to load additional operators that the selections may rely upon.

Once the debugger identifies the minimal subset of operators, the debugger may compile the operators on the computer system. The debugger may execute the operators and generate output that a developer may evaluate. Further, the debugger may continuously monitor a corresponding live deployment of the streams processing environment. The debugger may do so to detect changes in the operator graph that may affect the minimal subset of operators. For example, the debugger may detect that an operator that was previously inactive is currently sending tuples to a selected operator. In such a case, the debugger may include the newly active operator to the minimal subset of operators. The debugger may also notify the developer of the change in the debugging environment.

Advantageously, identifying a subset of operators to execute in a debugging environment provides a more efficient approach to debugging operators in a streams processing environment. That is, rather than load the entirety of an operator graph into a debugging environment, a developer may select desired operators to evaluate with the debugger. The debugger, in turn, can load those selected operators and any operator required to produce data within the selected operators. As a result, the debugger evaluates only those operators relevant to what the developer wishes to debug, without loading and executing the entire streams processing environment into the debugger. Consequently, the debugging environment may execute the operators more efficiently.

Note, the following references a distributed application of a streams processing environment as a reference example of an application executing in a cluster of computing nodes, where processing elements in each node perform some task that results in data being output to other processing elements. However, one of skill in the art will recognize that embodiments presented herein may be adapted to a variety of applications having components that output expected amounts of data to other destinations.

As shown, computing environment 100 includes a computing cluster 105, a computer system 110, and one or more data sources 115. The computing cluster 105, computing system 110, and data sources 115 are each connected via a network 120 (e.g., the Internet).

In one embodiment, the computing cluster 105 includes multiple computing nodes 107. Each computing node may be a physical computing system or a virtual machine instance executing in a cloud computing environment. The nodes 107 each execute a distributed application 112. The distributed application 112 retrieves input streams of data from various data sources 115, e.g., over the network 120. Examples of such data include message data, XML documents, biometric data captured from an individual in real-time, etc. The distributed application 112 many analyze the input streams in manageable data units called "tuples." A tuple is a list of values. Further, the distributed application 112 includes processing elements executing on various nodes that perform a specified task using tuples as input. Tuples flow "downstream" from operator to operator in the streams processing environment.

The computer system 110 may be a physical computing system or a virtual machine instance in a cloud environment. In one embodiment, the computer system 110 includes an integrated development environment (IDE) tool 109. A developer in the streams processing environment may configure processing elements via the IDE tool 109, e.g., to specify which particular nodes to execute a given processing element, to specify a function of a given processing element, to specify a flow of tuples between processing elements, etc. Further, the IDE tool 109 includes a debugger 113. The debugger 113 allows the developer to pinpoint anomalies that occur during runtime of the streams processing environment. The debugger 113 may load operators of the streams processing environment to the computer system 110 and execute the operators. The debugger 113 may generate a log describing activity during a debugging session.

In one embodiment, the debugger 113 allows the developer to select which operators to observe for debugging. That is, rather than load an entire set of operators, the debugger 113 can load a subset of operators corresponding to the selected operators and those operators that may produce tuples relied upon by the selected operators. The debugger 113 identifies a minimal subset of operators needed to execute the operators specified by the developer. For example, in addition to the operators selected by the developer, the debugger 113 may include operators that send tuples to one of the selected operators. In addition, the debugger 113 may continuously monitor the computing cluster 105 to detect changes in active and inactive operators. In response, the debugger 113 may dynamically readjust the subset of operators.

Figure 2:
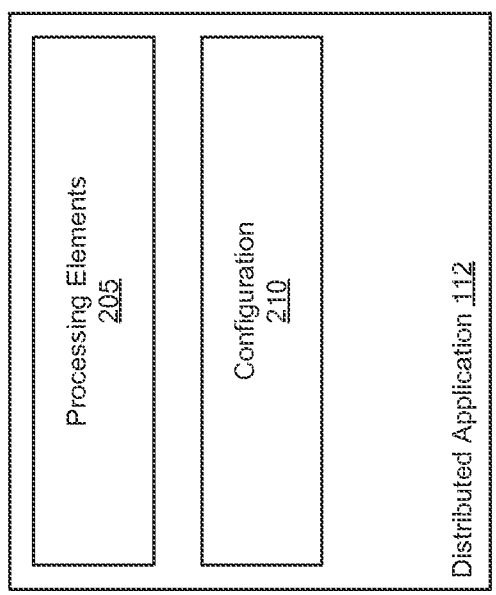
FIG. 2 further illustrates the distributed application described relative to FIG. 1, according to one embodiment.

FIG. 2 further illustrates the distributed application 112 described relative to FIG. 1, according to one embodiment. As shown, the distributed application 112 includes one or more processing elements 205 and a configuration 210.

As stated, processing elements 205 may be distributed to various nodes in the computing cluster 105. Each processing element 205 includes one or more operators. Each operator may perform a specified task associated with a data workload. For example, one operator may receive a tuple that consists of comma-delineated text values. The operator may determine the number of times a given term appears in the tuple and send the result to another operator, in addition to other specified information.

The configuration 210 specifies properties of the streams processing environment. For example, such properties may describe which node a given processing element 205 is located, a specified flow of data between processing elements 205, address information of each node, identifiers for processing elements 205, and the like.

Figure 3:
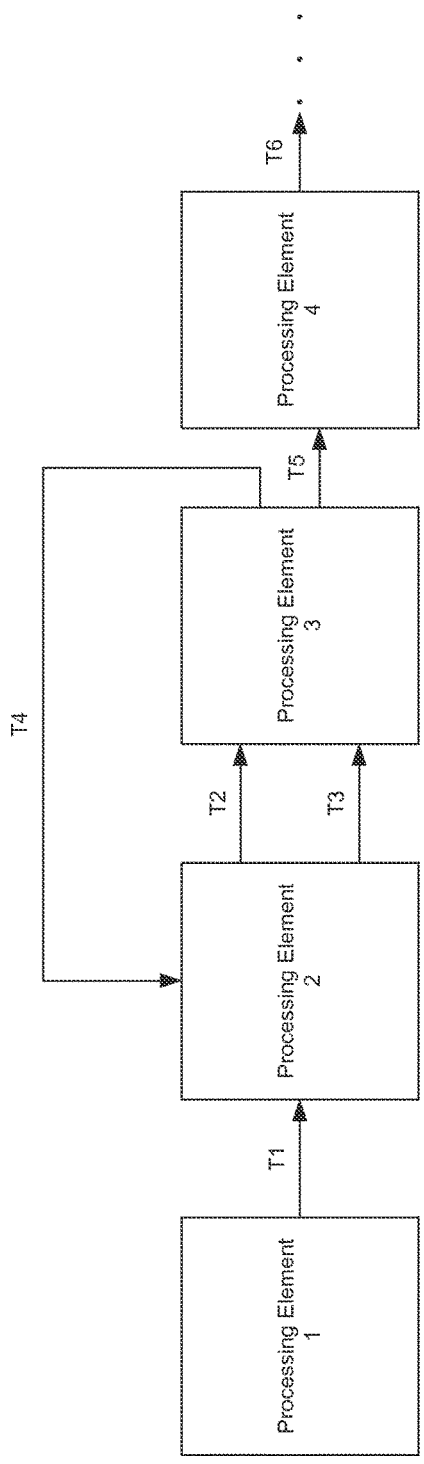
FIG. 3 illustrates an example operator graph, according to one embodiment.

FIG. 3 illustrates an example operator graph, according to one embodiment. As stated, a developer can configure processing elements and operators through an operator graph using the IDE tool 109. For example, the IDE tool 109 allows the developer to determine in which nodes to place each processing element, functions that each operator in the processing element performs, tuple destination processing elements, etc.

In this example, FIG. 3 depicts four processing elements 1-4. Illustratively, each processing element outputs tuples (T1-T6) to other processing elements. For example, processing element 1 outputs a tuple T1 to processing element 2. Processing element 2 performs a specified function on the tuple T1 and outputs tuples T2 and T3 to processing element 3. Further, processing elements may output tuples to different destination processing elements. As illustrated, processing element 3 outputs tuple T4 to processing element 2 and tuple T5 to processing element 4.

Figure 4:
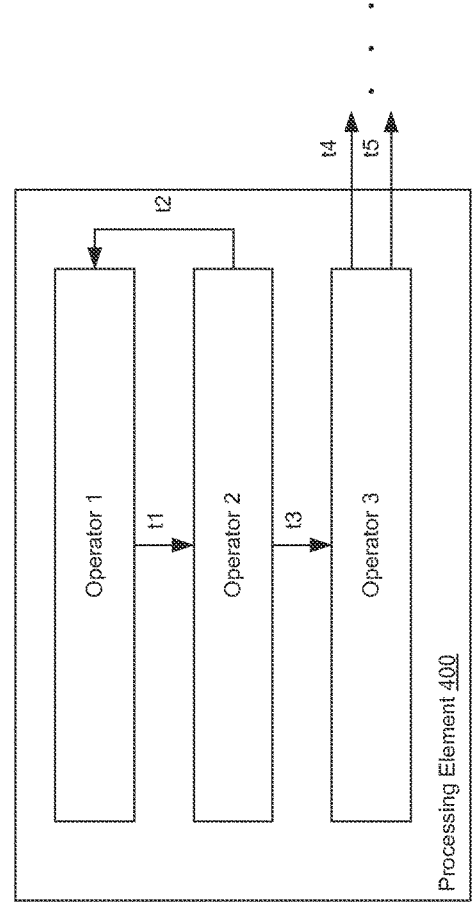
FIG. 4 illustrates an example processing element, according to one embodiment.

FIG. 4 illustrates an example processing element, according to one embodiment. As shown, the processing element 400 includes operators 1, 2, and 3. Illustratively, tuples t1-t5 flow from each operator to destination operators or to destination processing elements. Multiple tuples may flow from a given operator or processing element.

In practice, a streams processing environment can have thousands to tens of thousands of operators executing in the computing cluster 105. During a debugging phase, the debugger 113 may generate a graphical representation of the operator graph 300 and present the representation to the developer. For example, the graphical representation may display which processing elements include which operators, and connections between each processing element and operator. The developer may select, from the graphical representation, which of the operators to debug. The debugger 113 receives the selection and identifies a minimal subset of operators for execution in the debugging environment. As stated, the minimal subset of operators can include the selected operators as well as any operators downstream or upstream that the selected operators may rely upon for input or output.

Figure 5:
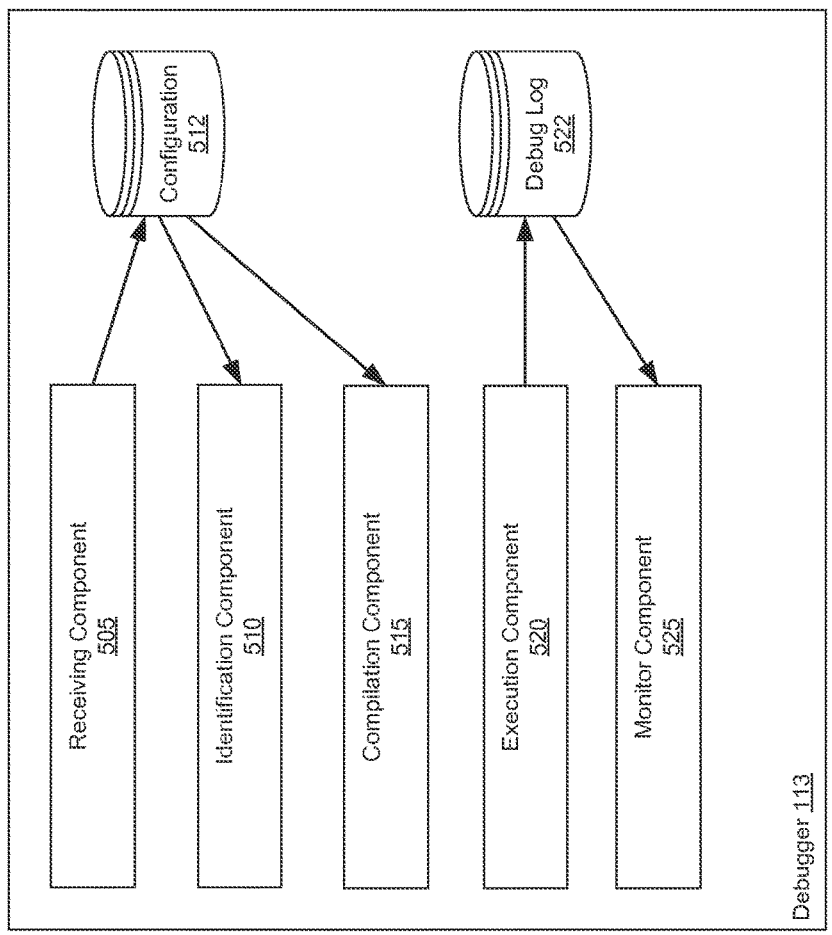
FIG. 5 further illustrates the debugger described relative to FIG. 1, according to one embodiment.

FIG. 5 further illustrates the debugger 109 described relative to FIG. 1, according to one embodiment. As shown, the debugger 113 includes a receiving component 505, an identification component 510, a compilation component 515, an execution component 520, a monitor component 525, a configuration 512, and a debug log 522.

In one embodiment, the receiving component 505 may obtain, e.g., from a developer, a selection of one or more operators in the streams processing environment to execute in a debugging environment. For example, the developer may select the operators from a graphical representation of the operator graph and submit the selection via the IDE tool 109. As another example, the receiving component 505 may obtain the selection as a result of executing a debugging script.

Further, the receiving component 505 may receive specifications for the configuration 512, such as a number of downstream operators (apart from the selected operators) related to the selected operators for observing tuple output. Further, specifications may also include whether to include virtual source/sink operators for a given selected operator. A virtual source operator is one that sends arbitrary tuples to the selected operator, which eliminates the need for including the actual operator that sends tuples to the selected operator. A virtual sink operator is one that receives processed tuples from a selected operator, which eliminates the need for including the actual operator that receives and processes tuples from the selected operator.

In one embodiment, the identification component 510 determines a minimal subset of operators based on the selection of operators. To do so, the identification component 510 may evaluate downstream and upstream paths associated with each selected operator. For each selected operator, the identification component 510 may add, to the subset, other operators that send tuples to the operator as well as the next n operators (specified in the configuration 512) in the downstream path associated with that operator. The identification component 510 may also evaluate a history of any of the related operators to determine whether those operators have actually sent tuples to a selected operator during actual runtime of the streams processing environment (e.g., in the previous x cycles). The identification component 510 may omit operators from the subset that are "inactive" (i.e., have not sent tuples to that operator in the last x cycles). Further, if the configuration 512 specifies that virtual source and sink operators are to be used for a given operator, the identification component 510 may remove the actual operators (related to the selected operator) from the subset.

In one embodiment, the identification component 510 may present, to the developer, the identified minimal subset of operators. For example, the IDE tool 109 may provide a graphical display of the operator graph with the identified operators highlighted and the remaining operators greyed out. The debugger 113 may allow the developer to select any of the greyed-out operators for including in the subset. The receiving component 505 obtains the selection, and in turn, the identification component 510 includes the operators into the set.

Once the identification component 510 determines the minimal subset of operators for executing in the debugging environment, the compilation component 515 compiles the subset of operators (and virtual source and sink operators, if specified). The execution component 520 starts runtime of the compiled operators and generates output for the developer to observe. Further, the execution component 520 may output logging data to the debug log 522 for the developer to review.

In one embodiment, the monitor component 525 observes activity of the presently running streams processing environment (i.e., an actual deployment of the distributed application 112 in the computing cluster 105). The monitor component 525 may communicate changes in the deployment to the debugging environment. For example, assume that the identification component 510 previously omitted an operator from the subset due to inactivity. The monitor component 525 may observe in the deployed streams processing environment that the omitted operator is currently sending tuples to a selected operator. The monitor component 525 may send that information to the identification component 510, which can add that operator to the subset. The compilation component 515 may recompile the subset, and the execution component 520 may then run the new subset of operators.

Figure 6:
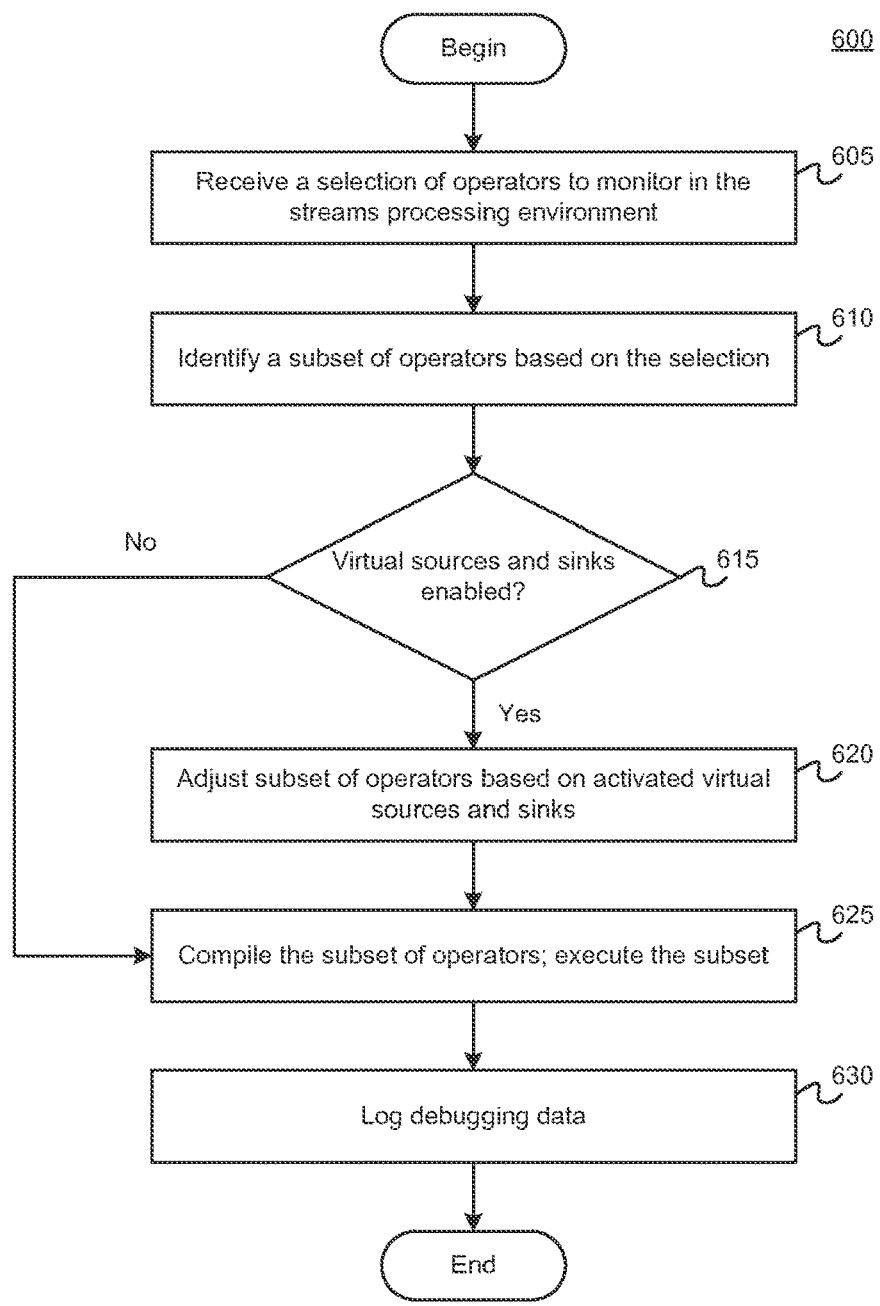
FIG. 6 illustrates a method for debugging a subset of operators of a streams processing environment.

FIG. 6 illustrates a method 600 for debugging a subset of operators of a streams processing environment. As shown, the method 600 begins at step 605, where the receiving component 505 receives a selection of operators to monitor (for debugging) in a streams processing environment. The selection may also specify whether to include virtual source/sink operators, whether to include a next n amount of downstream operators, whether to include inactive operators, etc.

At step 610, the identification component 510 determines a minimal subset of operators to observe in the debugging environment. As stated, the identification component 510 evaluates upstream paths of the operator graph. Doing so allows the identification component 510 to identify which operators send tuples to each selected operator. The identification component 510 may add such operators to the minimal subset. Further, the identification component 510 evaluates downstream paths of the operator graph to include a specified amount of operators occurring next in the path.

At step 615, the identification component 510 determines whether virtual sources and sink operators are enabled for each selected operator. If so, then at step 620, the identification component 510 adjusts the minimal subset based on where in the operator selections that the virtual sources and/or sinks are enabled, e.g., by removing the previously identified related operators from the graph. At step 625, the compilation component 515 compiles the resulting minimal subset of operators, and the execution component 520 runs the compiled operators. At step 630, the execution component 520 may also log debugging data for the developer to evaluate.

Figure 7:
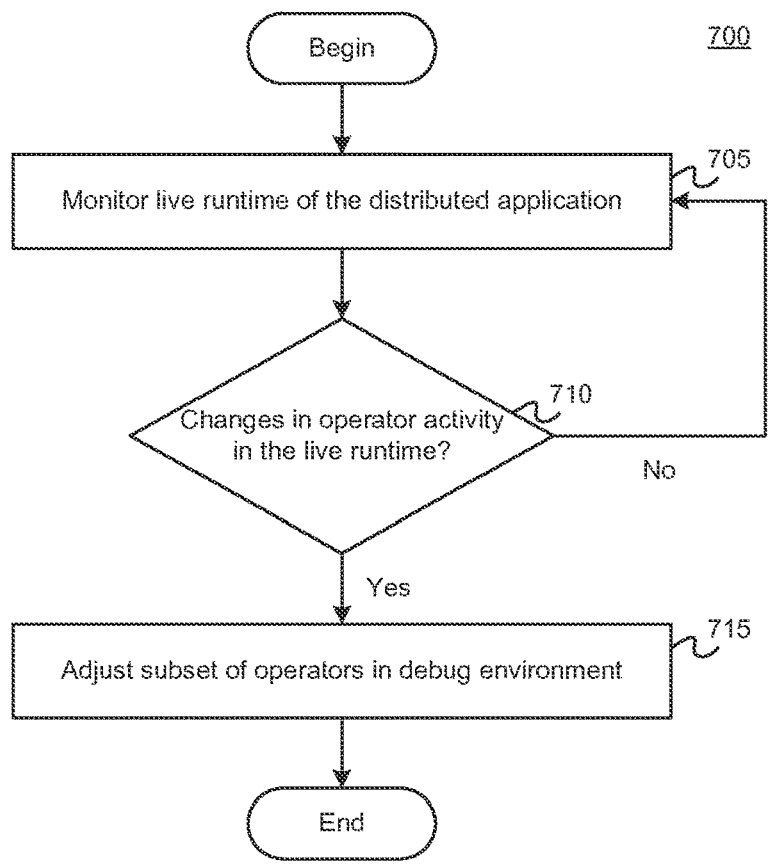
FIG. 7 illustrates a method for dynamically adjusting a subset of operators for debugging in a streams processing environment.

FIG. 7 illustrates a method 700 for dynamically adjusting a subset of operators for debugging in a streams processing environment. As stated, the monitor component 525 may continuously observe the live streams processing environment and communicate information to the debugging environment, such as changes to the live streams processing environment.

As shown, method 700 begins at step 705, where the monitoring component 525 observes the live runtime of the distributed application 112. At step 710, the monitoring component 525 determines whether any changes in operator activity are present in the live streams processing environment. As stated, such changes may include whether a previously inactive operator is currently sending tuples to one of the selected operators in the subset. Other changes may include whether a given selected operator becomes dependent on new operators. Further, the monitoring component 525 may also detect changes in operation configuration. For example, a given operator may be executing in two threads and subsequently execute in four threads as a result of increased tuple traffic in the streams processing environment.

If changes are present, then at step 715, the debugger 113 adjusts the subset of operators in the debugging environment. To do so, the monitoring component 525 communicates the changes to the identification component 510. In turn, the identification component 510 adds operators identified in the changes shown to be active or newly interacting with the selected operators. The compilation component 515 re-compiles the subset of operators, and the execution component 520 runs the compiled subset.

Further, the behavior of the identification component 510 can be adjusted relative to the specified configuration 512. For example, the configuration 512 may specify to override adding such operators to the minimal subset. In such a case, the identification component 510 omits, based on the configuration 512, the operators identified in the changes from the subset.

Figure 8:
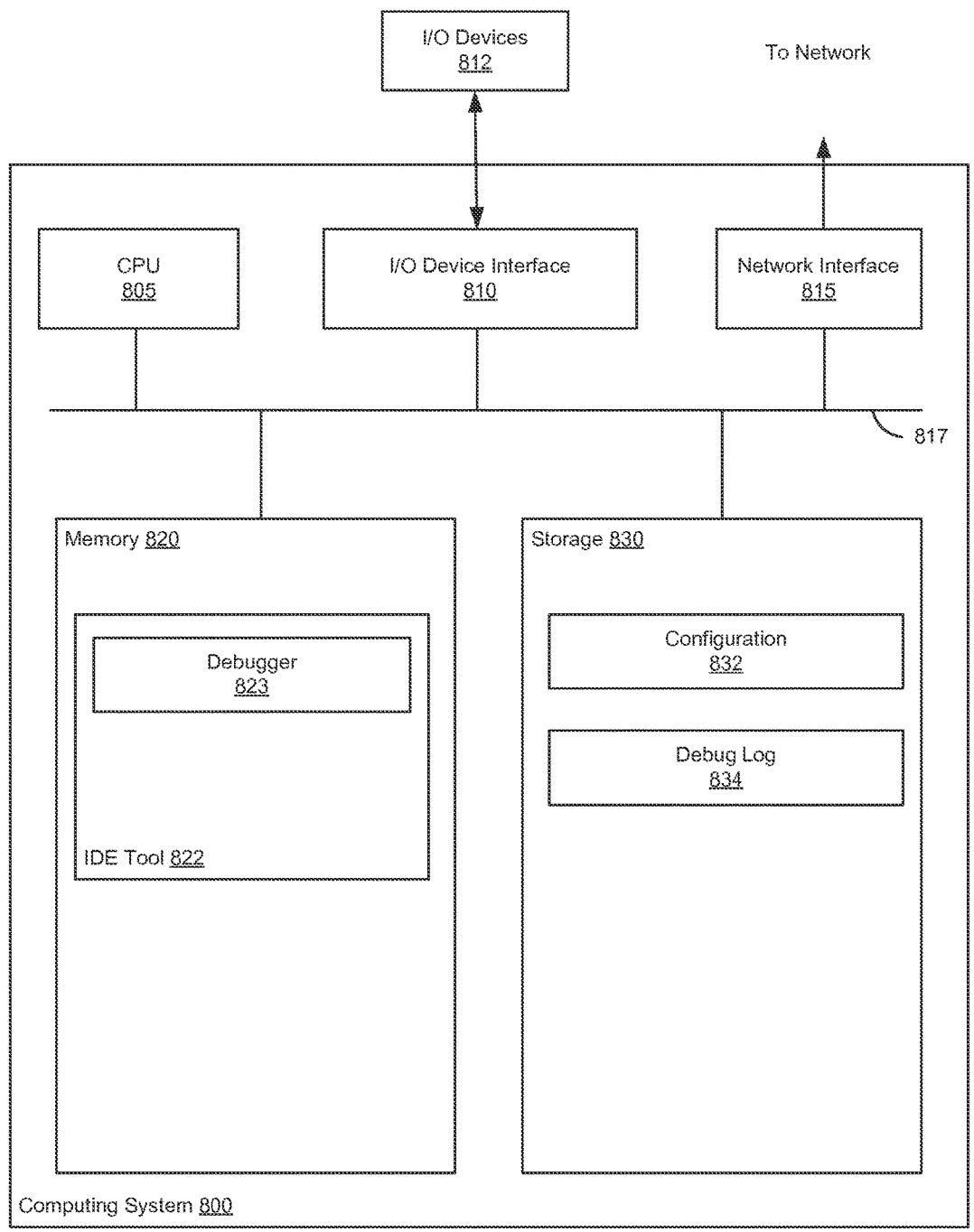
FIG. 8 illustrates an example computer system configured to debug a subset of operators in a streams processing environment, according to one embodiment.

FIG. 8 illustrates an example computer system 800 configured to debug a subset of operators in a streams processing environment, according to one embodiment. As shown, the computing system 800 includes, a central processing unit (CPU) 805, a network interface 815, a memory 820, and storage 830, each connected to a bus 817. The computing system 800 may also include an I/O device interface 810 connecting I/O devices 812 (e.g., keyboard, display and mouse devices) to the computing system 800. Further, in context of this disclosure, the computing elements shown in the computing system 800 may correspond to a physical computing system.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 817, and memory 820. Note, CPU 805 is included to be representative of a single CPU, multiple CPUs, a single CPU having multiple processing cores, and the like. Memory 820 is generally included to be representative of a random access memory. Storage 820 may be a disk drive storage device. Although shown as a single unit, storage 830 may be a combination of fixed and/or removable storage devices, such as fixed disc drives, removable memory cards, or optical storage, network attached storage (NAS), or a storage area-network (SAN).

Illustratively, memory 820 includes an integrated development environment (IDE) tool 722. And storage 830 includes a configuration 832 and a debug log 834. A developer uses the IDE tool 822 to design processing elements and operators in a streams processing environment. The IDE tool 822 itself includes a debugger 823. The debugger 823 receives a selection of operators to observe in a debugging environment. Based on this selection (and the specifications in the configuration 832), the debugger 823 identifies a minimal subset of operators to observe in the environment. For example, the minimal subset may include, in addition to the selected operators, operators that output tuples to the selected operators, a next n amount of downstream operators relative to a selected operator, etc. The debugger 823 may then compile and execute the identified minimal subset of operators.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects disclosed herein.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (the IDE tool and debugger) or related data available in the cloud. For example, the debugger could execute on a computing system in the cloud and identify a minimal subset of operators from a larger set of operators based on an operator selection. In such a case, the debugger could execute the compiled subset of operators and store debug data at a storage location in the cloud. Doing so allows a user to access this information from any computing system attached to a network connected to the cloud (e.g., the Internet).

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method to reduce a processing overhead in operator debugging, by implementing operator selectivity, the computer-implemented method comprising:

receiving, by a debugger, a selection of operators from a plurality of operators included in a distributed application, wherein the distributed application executes the plurality of operators in a runtime environment, wherein the debugger comprises a plurality of components including an identification component, a compilation component, an execution component, and a monitor component;

automatically identifying, by the identification component of the debugger when executed by one or more computer processors, a minimal subset of the plurality of operators to execute in a debugging environment, wherein the minimal subset is identified by evaluating (i) an upstream or downstream path associated with each of the plurality of operators and (ii) whether tuples are actually transmitted via the upstream or downstream path of the respective operator during runtime in a plurality of historical instances of executing the distributed application, wherein the minimal subset includes at least (i) the selected operators and (ii) a plurality of immediately upstream operators, wherein each of the plurality of immediately upstream operators provides input directly to at least one of the selected operators, wherein at least one operator in the plurality of operators is not included in the minimal subset;

compiling, by the compilation component of the debugger, only the identified minimal subset of operators in the debugging environment;

executing, by the execution component of the debugger, only the compiled minimal subset of operators in the debugging environment, thereby supporting operator debugging with a reduced processing overhead relative to executing an entirety of the plurality of operators included in the distributed application; and monitoring, by the monitor component of the debugger, and based on a live deployment of the distributed application, dormancy of the plurality of operators in the distributed application, in order to identify one or more operators as being dormant operators based on: the one or more operators being, for at least a predefined period of time, active in the runtime environment without providing input to any of the selected operators; whereafter the minimal subset of operators is dynamically adjusted, recompiled, and executed based on one or more changes in the monitored dormancy, including removal of the one or more operators from the minimal subset.

2. The computer-implemented method of claim 1, wherein the minimal subset further includes, a virtual source operator that sends tuples to at least one of the selected operators, wherein the virtual source operator provides arbitrary data and is not included within the runtime environment.

3. The computer-implemented method of claim 1, wherein the minimal subset further includes, a virtual sink operator that receives tuples from at least one of the selected operators, wherein the virtual sink operator is not included within the runtime environment.

4. The computer-implemented method of claim 1, wherein the minimal subset further includes one or more downstream operators associated with at least one of the selected operators.

5. The computer-implemented method of claim 1, wherein the debugger further comprises a receiving component configured to receive the selection of operators, wherein the minimal subset is identified by evaluating (i) the upstream path and the downstream path associated with each of the plurality of operators and (ii) for each of the upstream path and the downstream path, whether tuples are actually transmitted via the respective path of the respective operator during runtime in the plurality of historical instances of executing the distributed application.

6. The computer-implemented method of claim 5, further comprising:

monitoring the plurality of operators executing in the runtime environment; determining that at least one of the identified dormant operators provided input to at least one of the selected operators in the runtime environment; and adding the at least one dormant operator to the identified minimal subset of the plurality of operators.

7. The computer-implemented method of claim 6, wherein the minimal subset further includes, a virtual source operator that sends tuples to at least one of the selected operators, wherein the virtual source operator provides arbitrary data and is not included within the runtime environment; wherein the minimal subset further includes, a virtual sink operator that receives tuples from at least one of the selected operators, wherein the virtual sink operator is not included within the runtime environment.

8. The computer-implemented method of claim 7, wherein the minimal subset further includes one or more downstream operators associated with at least one of the selected operators, wherein the computer-implemented method further comprises, prior to executing the subset of the plurality of operators:

receiving a second selection of operators from the plurality of operators; and adjusting the identified minimal subset of the plurality of operators based on the second selection.

9. The computer-implemented method of claim 1, wherein the subset further includes at least one of a virtual source operator and a virtual sink operator.

10. A computer program product to reduce a processing overhead in operator debugging, by implementing operator selectivity, the computer program product comprising:

a computer-readable storage medium having computer-readable program code, of a debugger, embodied therewith, the computer-readable program code executable by one or more computer processors to perform an operation comprising:

receiving, by the debugger, a selection of operators from a plurality of operators included in a distributed application, wherein the distributed application executes the plurality of operators in a runtime environment, wherein the debugger comprises a plurality of components including an identification component, a compilation component, an execution component, and a monitor component;

automatically identifying, by the identification component of the debugger when executed by one or more computer processors, a minimal subset of the plurality of operators to execute in a debugging environment, wherein the minimal subset is identified by evaluating (i) an upstream or downstream path associated with each of the plurality of operators and (ii) whether tuples are actually transmitted via the upstream or downstream path of the respective operator during runtime in a plurality of historical instances of executing the distributed application, wherein the minimal subset includes at least the selected operators and (ii) a plurality of immediately upstream operators, wherein each of the plurality of immediately upstream operators provides input directly to at least one of the selected operators, wherein at least one operator in the plurality of operators is not included in the minimal subset; compiling, by the compilation component of the debugger, only the identified minimal subset of operators in the debugging environment;

executing, by the execution component of the debugger, only the compiled minimal subset of the plurality of operators in the debugging environment, thereby supporting operator debugging with a reduced processing overhead relative to executing an entirety of the plurality of operators included in the distributed application; and monitoring, by the monitor component of the debugger, and based on a live deployment of the distributed application, dormancy of the plurality of operators in the distributed application, in order to identify one or more operators as being dormant operators based on: the one or more operators being, for at least a predefined period of time, active in the runtime environment without providing input to any of the selected operators; whereafter the minimal subset of operators is dynamically adjusted, recompiled, and executed based on one or more changes in the monitored dormancy, including removal of the one or more operators from the minimal subset.

11. The computer program product of claim 10, wherein the minimal subset further includes a virtual source operator that sends tuples to at least one of the selected operators, wherein the virtual source operator provides arbitrary data and is not included within the runtime environment.

12. The computer program product of claim 10, wherein the subset further includes, a virtual sink operator that receives tuples from at least one of the selected operators, wherein the virtual sink operator is not included within the runtime environment.

13. The computer program product of claim 10, wherein the minimal subset further includes one or more downstream operators associated with at least one of the selected operators.

14. The computer program product of claim 10, wherein the subset further includes at least one of a virtual source operator and a virtual sink operator.

15. A system to reduce a processing overhead in operator debugging, by implementing operator selectivity, the sytsem comprising: one or more computer processors; and a memory storing a program comprising a debugger which, when executed on the one or more computer processors, performs an operation comprising:

receiving, by the debugger, a selection of operators from a plurality of operators included in a distributed application, wherein the distributed application executes the plurality of operators in a runtime environment, wherein the debugger comprises a plurality of components including an identification component, a compilation component, an execution component, and a monitor component;

automatically identifying, by the identification component of the debugger when executed by one or more computer processors, a minimal subset of the plurality of operators to execute in a debugging environment, wherein the minimal subset is identified by evaluating (i) an upstream or downstream path associated with each of the plurality of operators and (ii) whether tuples are actually transmitted via the upstream or downstream path of the respective operator during runtime in a plurality of historical instances of executing the distributed application, wherein the minimal subset includes at least the selected operators and (ii) a plurality of immediately upstream operators, wherein each of the plurality of immediately upstream operators provides input directly to at least one of the selected operators, wherein at least one operator in the plurality of operators is not included in the minimal subset; compiling, by the compilation component of the debugger, only the identified minimal subset of operators in the debugging environment;

executing, by the execution component of the debugger, only the compiled minimal subset of the plurality of operators in the debugging environment, thereby supporting operator debugging with a reduced processing overhead relative to executing an entirety of the plurality of operators included in the distributed application; and monitoring, by the monitor component of the debugger, and based on a live deployment of the distributed application, dormancy of the plurality of operators in the distributed application, in order to identify one or more operators as being dormant operators based on: the one or more operators being, for at least a predefined period of time, active in the runtime environment without providing input to any of the selected operators; whereafter the minimal subset of operators is dynamically adjusted, recompiled, and executed based on one or more changes in the monitored dormancy., including removal of the one or more operators from the minimal subset.

16. The system of claim 15, wherein the subset further includes a virtual source operator that sends tuples to at least one of the selected operators, wherein the virtual source operator provides arbitrary data and is not included within the runtime environment.

17. The system of claim 15, wherein the subset further includes, a virtual sink operator that receives tuples from at least one of the selected operators, wherein the virtual sink operator is not included within the runtime environment.

18. The system of claim 15, wherein the minimal subset further includes one or more downstream operators associated with at least one of the selected operators.

19. The system of claim 15, wherein the subset further includes at least one of a virtual source operator and a virtual sink operator.

20. The system of claim 15, wherein the debugger further comprises a receiving component configured to receive the selection of operators.

* * * * *